(12) United States Patent
Chen et al.

(10) Patent No.: US 8,199,760 B2
(45) Date of Patent: Jun. 12, 2012

(54) PEER TO PEER SVC-BASED DSL SERVICE

(75) Inventors: Wenge Chen, Pleasanton, CA (US);
Peter Chou, San Ramon, CA (US);
Kuo-Hui Liu, San Ramon, CA (US);
Michael P. Sinwald, Tracy, CA (US);
Shih Chung Soon, Dublin, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 355 days.

(21) Appl. No.: 12/554,463

(22) Filed: Sep. 4, 2009

(65) Prior Publication Data

US 2009/0327500 A1 Dec. 31, 2009

Related U.S. Application Data

(63) Continuation of application No. 10/286,786, filed on Nov. 4, 2002, now Pat. No. 7,602,788.

(51) Int. Cl.
*H04L 12/56* (2006.01)
*H04L 12/28* (2006.01)

(52) U.S. Cl. .................................. 370/395.2; 370/401

(58) Field of Classification Search .................. None
See application file for complete search history.

(56) References Cited

U.S. PATENT DOCUMENTS

| | | | |
|---|---|---|---|
| 4,494,231 A | 1/1985 | Slawy et al. |
| 5,051,982 A | 9/1991 | Brown et al. |
| 5,274,643 A | 12/1993 | Fisk |
| 5,490,141 A | 2/1996 | Lai et al. |
| 5,610,969 A | 3/1997 | McHenry et al. |
| 5,764,645 A | 6/1998 | Bernet et al. |
| 5,828,838 A | 10/1998 | Downs et al. |
| 5,842,040 A | 11/1998 | Hughes et al. |
| 5,892,924 A | 4/1999 | Lyon et al. |
| 5,920,562 A | 7/1999 | Christie et al. |
| 5,923,740 A | 7/1999 | Ito et al. |
| 5,933,412 A | 8/1999 | Choudhury et al. |
| 5,943,337 A | 8/1999 | Sasagawa |

(Continued)

FOREIGN PATENT DOCUMENTS

EP 8-186580 7/1996

(Continued)

OTHER PUBLICATIONS

Clark et al., "Bandwidth-on-Demand Networks—A Solution to Peer-to-Peer File Sharing", BT Technology Journal, vol. 20, No. 1, pp. 53-63, (Jan. 2002).

(Continued)

*Primary Examiner* — Clemence Han
(74) *Attorney, Agent, or Firm* — Greenblum & Bernstein, PLC

(57) ABSTRACT

Policy-based routing of packets over a peer-to-peer, quality of service connection includes sending a connection setup request, over a control connection to a connection establishing device, to dynamically establish the peer-to-peer, quality of service connection between a source peer implemented on at least one device and a destination peer implemented on at least one device. Packets originating from an application requiring a specified level of service are transmitted, from the source peer implemented on at least one device, over the peer-to-peer, quality of service connection. Packets originating from an application that does not require the specified level of service are transmitted, from the source peer implemented on at least one device, over a best effort connection.

19 Claims, 3 Drawing Sheets

U.S. PATENT DOCUMENTS

| | | | |
|---|---|---|---|
| 5,953,338 | A | 9/1999 | Ma et al. |
| 5,956,334 | A | 9/1999 | Chu et al. |
| 5,970,064 | A | 10/1999 | Clark et al. |
| 5,974,048 | A | 10/1999 | Godse et al. |
| 5,991,301 | A | 11/1999 | Christie |
| 5,999,514 | A | 12/1999 | Kato |
| 5,999,518 | A | 12/1999 | Nattkemper et al. |
| 5,999,532 | A | 12/1999 | Terasaki |
| 6,028,924 | A | 2/2000 | Ram et al. |
| 6,028,933 | A | 2/2000 | Heer et al. |
| 6,031,840 | A | 2/2000 | Christie et al. |
| 6,032,118 | A | 2/2000 | Tello et al. |
| 6,035,405 | A | 3/2000 | Gage et al. |
| 6,041,109 | A | 3/2000 | Cardy et al. |
| 6,073,160 | A | 6/2000 | Grantham et al. |
| 6,081,518 | A | 6/2000 | Bowman-Amuah |
| 6,094,437 | A | 7/2000 | Loehndorf, Jr. et al. |
| 6,097,720 | A | 8/2000 | Araujo et al. |
| 6,097,722 | A | 8/2000 | Graham et al. |
| 6,118,785 | A | 9/2000 | Araujo et al. |
| 6,122,255 | A | 9/2000 | Bartholomew et al. |
| 6,137,793 | A | 10/2000 | Gorman et al. |
| 6,141,339 | A | 10/2000 | Kaplan et al. |
| 6,148,074 | A | 11/2000 | Miloslavsky et al. |
| 6,160,810 | A | 12/2000 | Brodigan |
| 6,167,432 | A | 12/2000 | Jiang |
| 6,169,735 | B1 | 1/2001 | Allen, Jr. et al. |
| 6,181,693 | B1 | 1/2001 | Maresca |
| 6,219,348 | B1 | 4/2001 | Allen, Jr. et al. |
| 6,222,842 | B1 | 4/2001 | Sasyan et al. |
| 6,229,810 | B1 | 5/2001 | Gerszberg et al. |
| 6,252,857 | B1 | 6/2001 | Fendick et al. |
| 6,275,493 | B1 | 8/2001 | Morris et al. |
| 6,289,001 | B1 | 9/2001 | Smyk |
| 6,292,495 | B1 | 9/2001 | Von Hammerstein et al. |
| 6,298,043 | B1 | 10/2001 | Mauger et al. |
| 6,345,048 | B1 | 2/2002 | Allen, Jr. et al. |
| 6,345,051 | B1 | 2/2002 | Gupta et al. |
| 6,366,577 | B1 | 4/2002 | Donovan |
| 6,366,580 | B1 | 4/2002 | Bradley et al. |
| 6,366,948 | B1 | 4/2002 | Teibel |
| 6,373,930 | B1 | 4/2002 | McConnell et al. |
| 6,389,011 | B2 | 5/2002 | Allen, Jr. et al. |
| 6,396,815 | B1 * | 5/2002 | Greaves et al. ............... 370/256 |
| 6,400,716 | B1 | 6/2002 | Munakata et al. |
| 6,434,612 | B1 | 8/2002 | Hughes et al. |
| 6,473,427 | B1 | 10/2002 | Brodigan |
| 6,473,430 | B2 | 10/2002 | Sreedharan et al. |
| 6,529,479 | B1 | 3/2003 | Suzuki |
| 6,542,475 | B1 | 4/2003 | Bala et al. |
| 6,563,835 | B1 | 5/2003 | Chen |
| 6,597,689 | B1 | 7/2003 | Chiu et al. |
| 6,618,381 | B1 | 9/2003 | Miyamoto et al. |
| 6,621,793 | B2 | 9/2003 | Widegren et al. |
| 6,633,569 | B2 | 10/2003 | Hemmady |
| 6,667,971 | B1 * | 12/2003 | Modarressi et al. .......... 370/352 |
| 6,801,508 | B1 | 10/2004 | Lim |
| 6,842,449 | B2 | 1/2005 | Hardjono |
| 6,870,830 | B1 | 3/2005 | Schuster et al. |
| 2001/0026553 | A1 | 10/2001 | Gallant et al. |
| 2001/0044339 | A1 | 11/2001 | Cordero et al. |
| 2001/0048683 | A1 | 12/2001 | Allan et al. |
| 2002/0010866 | A1 | 1/2002 | McCullough et al. |
| 2002/0024954 | A1 | 2/2002 | Cunetto et al. |
| 2002/0044567 | A1 | 4/2002 | Voit et al. |
| 2002/0071427 | A1 | 6/2002 | Schneider et al. |
| 2002/0071472 | A1 | 6/2002 | Dickson |
| 2002/0126674 | A1 | 9/2002 | Hemmady et al. |
| 2002/0143959 | A1 | 10/2002 | El-Baze et al. |
| 2002/0150110 | A1 | 10/2002 | Inbar et al. |
| 2002/0156914 | A1 | 10/2002 | Lo et al. |
| 2002/0176404 | A1 | 11/2002 | Girard |
| 2003/0016676 | A1 | 1/2003 | Allen et al. |
| 2003/0031184 | A1 | 2/2003 | Cunetto |
| 2003/0091037 | A1 | 5/2003 | Latif et al. |
| 2003/0128698 | A1 | 7/2003 | Darland et al. |
| 2003/0133454 | A1 | 7/2003 | Gallant et al. |
| 2003/0227877 | A1 * | 12/2003 | Kar et al. ...................... 370/252 |
| 2004/0107238 | A1 | 6/2004 | Orton et al. |
| 2005/0036460 | A1 | 2/2005 | Dougherty et al. |
| 2008/0019386 | A1 * | 1/2008 | Chen et al. .................... 370/401 |

FOREIGN PATENT DOCUMENTS

| | | |
|---|---|---|
| EP | 0961519 | 12/1999 |
| WO | 98/26627 | 6/1998 |
| WO | 98/36612 | 8/1998 |
| WO | 98/37727 | 8/1998 |
| WO | 99/30530 | 6/1999 |
| WO | 00/62496 | 10/2000 |
| WO | 03/009528 | 1/2003 |

OTHER PUBLICATIONS

Loeser et al., "Distributed Video on Demand Services on Peer to Peer Basis", 1st International Workshop on Real-Time LANs in the Internet Age, pp. 1-4, downloaded from the internet at hurray.isep.ipp.pt/rtlia2002/full_papers/20_rtlia.pdf, (Jun. 2002).

"Efficient Routing of Packets for Multi-Media, Peer to Peer Applications", IBM Technical Disclosure Bulletin, May, 1994, pp. 459-460, (May 1994).

"Method for the Conversion of Multimedia Streams to Packet Streams", IBM Technical Disclosure Bulletin, pp. 95-98, (Jun. 1994).

Bauer et al., "The Personal Router", The Eight ACM International Conference on Mobile Computing and Networking, p. 1, (Sep. 2002).

"User Interface Design for Videoconferencing Entries", IBM Technical Disclosure Bulletin, pp. 539-540, (Apr. 1994).

Clark et al., "The Personal Router Whitepaper", MIT Laboratory for Computer Science, Version 2.0, downloaded from the internet at analcs.mit.edu/anaweb/PDF/PR_whitepaper_v2.pdf, (Mar. 2001).

English Language Abstract of JP 8-186580, 1996.

Printout of a website entitled "Abstract—Security for Asynchronous Transfer Mode (ATM) Networks", WPI Department of Electrical and Computer Engineering, (Apr. 1996).

Winkelstein, "ATM Security VPN Case Study", Celotek Corporation, 1999.

Riggs, "Telcos to Open ATM SVC Floodgate", pp. 1-3, downloaded from the internet at lantimes.com, (Mar. 1997).

"Voice Over ATM Switched Virtual Circuits on the Cisco MC3810", pp. 1-5, downloaded from the internet at cisco.com, 2000.

Taylor et al., "Do You Need Frame-to-ATM SVC", pp. 1-2, downloaded from the internet at nwfusion.com, (Jun. 2000).

Newman et al. "Ipsilon's General Switch Management Protocol Specification: The Internet Society, 1998", version 2, The Internet Society, Network Working Group, pp. 1-79, (1998).

Yager, "White Paper: Cisco Asymmetric Digital Subscriber Line Services Architecture", Cisco Systems, (Jul. 2000).

Marshall et al. "SIP Extensions for Media Authorization," pp. 1-23, downloaded from the internet at draft-ietf-sip-call-auth-01.txt, (Feb. 2001).

Marshall et al. "SIP Extensions for Media Authorization," pp. 1-25, downloaded from the internet at draft-ietf-sip-call-auth-00.txt, (Nov. 2000).

Reece et al., "The Broadband Call Control Demonstrator—A Platform for ITU-T, Davic and Tina-C Implementations," BT Technology Journal, vol. 16, No. 2, pp. 155-168, (Apr. 1998).

Zhou et al., "Efficient Location Management for Hybrid Wireless ATM Networks: Architecture and Performance Analysis," IEEE, pp. 378-382, (1999).

"cnfport: Configure Port—PXM1E", Cisco MGX 8830, MGX 8850 (PXM45 and PXM1E), and MGX 8950 Command Reference, Release 3, Part No. 78-14789-01 Rev. B0, p. 2-299, (Jan. 2003).

"dspport: Display Port—PXM1E", Cisco MGX 8830, MGX 8850 (PXM45 and PXM1E), and MGX 8950 Command Reference, Release 3, Part No. 78-14789-01 Rev. B0o, p. 2-749, (Jan. 2003).

* cited by examiner

PEER TO PEER SVC-BASED DSL SERVICE

CROSS-REFERENCE TO RELATED APPLICATION

This is a continuation application of pending U.S. patent application Ser. No. 10/286,786, filed on Nov. 4, 2002, the disclosure of which is expressly incorporated herein by reference in its entirety.

BACKGROUND OF THE INVENTION

1. Field of the Invention

The present invention relates to the field of telecommunications. More particularly, the present invention relates to dynamically establishing broadband QoS (Quality of Service) connections, on demand, between peers on a network to guarantee application specific IP QoS via the combination of ATM switched virtual connections (SVCs) and permanent virtual connection (PVCs).

2. Background Information

Network carriers are currently providing broadband access services to a large number of subscribers using asynchronous transfer mode (ATM) and digital subscriber lines (DSL). Under the current paradigm, subscribers connect to an Internet service provider (ISP) using a pre-existing static point-to-point or "nailed up" connection, e.g., a permanent virtual circuit (PVC). Once the connection has been established the subscriber can communicate to the ISP, via the connection, using various bridge or router modes. In the case of bridge mode, typically point-to-point protocol (PPP) or point-to-point protocol over Ethernet (PPPoE) is used to set up the user sessions and carry the user IP packets to the ISP. When a subscriber wishes to communicate with a peer subscriber, all communications via IP packets travel through the ISP, thus suffering implementation complexity and operational unfeasibility for supporting application specific QoS.

It would be desirable to have a system that permits a subscriber to connect to a peer subscriber via a guaranteed quality of service (QoS) connection, across the ATM network, while bypassing the ISP.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF EMBODIMENTS

Figure 1:
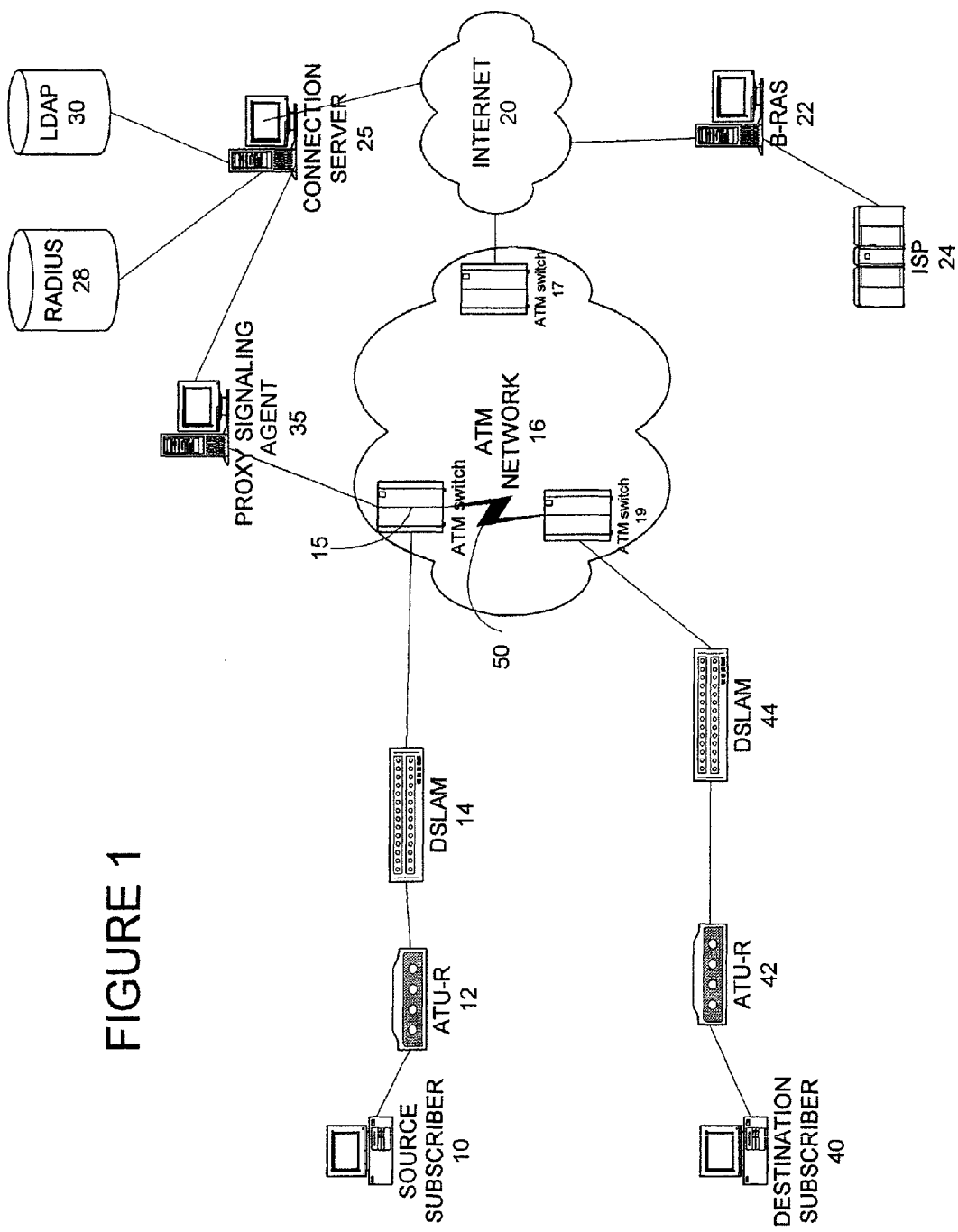
FIG. 1 is a block diagram showing an exemplary network architecture, according to an aspect of the present invention.

The present invention relates to dynamically establishing a shortcut connection to a peer device that a subscriber has selected, without going through an ISP.

In view of the above, the present invention through one or more of its various aspects and/or embodiments is presented to accomplish one or more objectives and advantages, such as those noted below.

According to an aspect of the present invention, a method is provided for dynamically establishing a peer to peer connection from a source subscriber to a destination subscriber. The method includes receiving at a connection server, a connection request via a control connection, the connection request requesting establishment of a QoS connection(s) to the destination subscriber. The method also includes forwarding the connection request to a proxy signaling agent; and signaling from the proxy signaling agent to a source switch, which the source subscriber connects to through a DSLAM to dynamically establish QoS connections to a destination switch, which the destination subscriber connects to through a DSLAM.

In one embodiment, the QoS connection is a switched virtual circuit (SVC). The request may include the destination subscriber, a class of service of the SVC and a traffic descriptor of the SVC.

The method may also include querying a database for information about the source subscriber, the destination subscriber and a network; and forwarding the information to the proxy signaling agent to enable the proxy signaling agent to establish the QoS connections.

The method may further include establishing the QoS connections, updating at least one routing table to reflect each QoS connection; and routing traffic in accordance with the updated routing tables so that application packets associated with the QoS connections are routed over the QoS connections and all other packets are routed over other connection(s). At least one routing table may be a routing table stored in the source subscriber PC and also a mapping table stored in an ADSL ATU-R.

In one embodiment, the method also includes tearing down the QoS connections; updating the routing tables to reflect that the QoS connections no longer exist; and routing traffic in accordance with the updated routing tables so that all traffic is routed over the other connection to the ISP.

The method may also include receiving a header pattern at the subscriber ATU, receiving application data from the subscriber client at the subscriber ATU-R, and determining whether to forward the received application packets over the dynamically established QoS connections based on whether the application packets match the header pattern. When the received application packets match the header pattern, the method includes forwarding the received application data over the QoS connections. When the received application packet is determined not to match the header pattern, the method includes forwarding the received application packet over another connection. The header pattern may include layer 3 and layer 4 information and the determination may include analyzing the layer 3 header and the layer 4 header of the received application packet to determine if the received application packet matches the header pattern.

The various aspects and embodiments of the present invention are described in detail below.

FIG. 1 is a block diagram depicting an exemplary network infrastructure in which the present invention operates. A subscriber's computer 10 is connected to a DSL ATU-R 12 at the subscriber's premises. Although the subscriber's computer is referred to as a PC in the following description, the computer is not limited to a personal computer. Rather the subscriber's computer (also referred to as a client) can be any device capable of communicating to an ISP.

An exemplary DSL ATU-R is the SpeedStream 5360 DSL Model, available from Efficient Networks, Inc. of Dallas Tex. The DSL ATU-R 12 connects to a digital subscriber line access multiplexer (DSLAM) 14 using a pre-existing digital subscriber line. The DSLAM 14 is connected to a high speed network, e.g., an ATM network 16. The DSLAM 14 connects to an ATM edge switch 15, which operates as a gateway into the ATM network 16. Although the following description refers only to ATM, any connection-oriented network that supports equivalent QoS can be substituted for the ATM network 16.

The ATM network 16 includes a number of ATM switches 15, 17, 19. Exemplary switches include the Alcatel 7670 Routing Switch Platform, available from Compagnie Financiere Alcatel of Paris, France. An exemplary DSLAM 14 is the Alcatel 7300 Advanced Services Access Manager, available from Compagnie Financière Alcatel of Paris, France.

An edge ATM switch 17 of the ATM network 16 connects via the Internet 20 to a service provider's broadband remote access server (B-RAS) 22. The B-RAS 22 terminates PPP connections for each DSL subscriber 10. An exemplary B-RAS 22 is an SMS 1800, available from Redback Networks Inc. of San Jose, Calif. The B-RAS 22 connects to the Internet service provider 24. The connection to the Internet service provider 24 is via a local connection, such as an Ethernet connection.

Typically the connection from the subscriber 10 to the B-RAS 22 is pre-provisioned and it will be referred to as a signaling connection or a control connection. In one embodiment, the control connection is a manually configured permanent virtual connection (PVC) though which a PPP session is established.

According to an aspect of the present invention, the subscriber 10 can dynamically select a peer device 40 to communicate with and can request QoS connections to the peer device by communicating over the control connection. In one embodiment, the QoS connection to the peer device 40 is a dynamically established SVC 50. Although the description refers to an SVC as the QoS connection, it is noted that an SVC is merely a non-limiting example of a QoS connection; and another type of QoS connection, such as Soft Permanent Virtual Circuit (SPVC), can be used instead of an SVC without departing from the scope and spirit of the present invention. An example of when a subscriber 10 might desire such a QoS connection is when the subscriber 10 desires to engage in a video conference with another subscriber 40.

In order to dynamically establish the SVC 50, the subscriber 10 transmits a connection setup request to the connection server 25. In the following description, subscriber refers to the combination of the client and an associated network service agent. The client communicates to the connection server 25 via an API to a software component, the network service agent, which is located on the client (bridge model) or ATU-R (routed model). The request, originating from the subscriber 10 is transmitted to the connection server 25 over the subscriber's best effort connection to the ISP. The request includes information about the SVC 50 (or SVCs, each being associated with a different application) to be setup, including the destination subscriber 40, a shared session key agreed upon by subscriber 10 and subscriber 40, a class of service of the SVC 50, and a traffic descriptor of the SVC 50. The class of service can be, for example, constant bit rate (CBR) or variable bit rate (VBR). The traffic descriptor describes the requested bandwidth in terms of ATM standard traffic descriptors, e.g., by sustained cell rate (SCR), peak cell rate (PCR), and maximum burst size (MBS).

The connection server 25 then queries an LDAP 30 for information about the subscriber 10 and the subscriber 40. The LDAP 30 receives such subscriber information, and information about the network as part of the provisioning process flow. Exemplary subscriber and network information includes the following information for both subscriber 10/switch 15 and subscriber 40/switch 19, the switch identifier (possibly an IP address or switch specific proprietary address), the physical port number, the logical port number, end system addresses (e.g., ATM AESA address) of source and destination UNIs; a set of VPI/VCIs at the source UNI and a set of VPI/VCIs at the destination UNI; and an address (e.g., an IP address) of a proxy signaling agent (PSA) 35. The LDAP 30 also stores some other network related information, such as up-link port speeds and DSL synchronization rates\needed for the connection server to calculate total available bandwidths and perform the CAC function for ATU-R and DSLAM ports.

Authorization and authentication information can also be retrieved from a RADIUS server 28, if necessary. In addition, accounting records can be stored on the RADIUS server 28. The RADIUS server 28 is provisioned with the user authentication information (username and password) as part of the customer management flow.

In one embodiment, the destination subscriber 40 must also perform the previously described actions by requesting a connection to the source subscriber 10 with identical parameters after the subscriber 40 receives the application session setup message from subscribe 10 through the best effort connection. By receiving connection requests from both subscribers 10, 40 within a time-out period, the connection server 25 considers the connection request to be both originated and accepted by both subscribers 10, 40.

After the necessary information, such as the ATM AESA addresses, VPI/VCIs, class of service, and bandwidth, etc., is obtained from the LDAP 30 and the RADIUS server 28, the connection server 25 performs a call admission control (CAC) step to determine if sufficient available bandwidth exists in the ATU-Rs and DSLAMs to accommodate the connection request. The connection server 25 maintains state information of the currently available bandwidth at each subscriber's ATU-R and related DSLAM up-links. If sufficient bandwidth is available, then the connection server 25 sends the SVC request and the necessary information to a proxy signaling agent 35. The proxy signaling agent 35 is responsible for performing the SVC signaling and relaying results and status information from the network elements to the connection server 25. That is, the proxy signaling server 35 communicates with the SVC capable ATM network 16 to establish, to tear down, and to obtain the status of SVC connections, and to obtain information about resource availability.

After receiving the necessary information, the proxy signaling agent 35 communicates with the requesting subscriber's edge switch 15 to initiate an SVC 50 to the destination subscriber's edge switch 19. The proxy signaling agent 35 informs the edge switch 15 of the destination switch address and then the SVC 50 is set up in the standard manner.

Once the SVC 50 is set up, proxy signaling agent 35 informs the connection server 25, then connection server 25 sends a message to both subscribers, specifically the network service agent associated with each client, informing them of the successful connection establishment. Then the routing tables are updated in both subscribers' PCs (for bridge mode) or ATU-Rs (for router mode) so that QoS application packets can be sent over the new QoS connection. In the bridge mode, a packet mapping table is also modified in the ATU-R. As is well known, every PC has a routing table to provide the routing information when multiple IP interfaces are available for outbound IP traffic. Routing entries in the routing table typically follow the syntax of <destination IP network address, network mask, gateway IP address, interface IP address, metric>. The operating system routing function will forward a packet according to the longest matched routing entries in the routing table based on the destination address in the packet.

According to the present invention, the location of the routing tables varies. In a bridge mode, the routing table is stored on the source subscriber's computer 10. In a routing mode, the routing tables are stored on the subscriber's ATU-R 12.

Regardless of where the routing table is stored, traffic packets are transmitted from the source subscriber 10 over either the new QoS connection or the default route to the ISP, based upon whether or not the packet originates from an application associated with the new QoS connection. For example, if the application requesting the SVC 50 is a video conferencing application and the packets being transmitted originate from the video conferencing application, then the video conferencing packets are transmitted over SVC 50. In other words, the packets travel from the subscriber 10, through the PVC from ATU-R 12 to the DSLAM 14, the SVC 50 from the ATM switch 15 to the ATM switch 19, and the PVC from the DSLAM 44 to the ATU-R-42 and finally to the destination subscriber 40. If the packet originates from other applications than the QoS application, the packets are transmitted, as usual, via the default route (or routes) to the ISP 24 and then on to its intended destinations.

Routing packets based upon the originating application will be referred to as policy based routing or filtering. Policy based routing ensures quality of service for specific end user applications. According to an aspect of the present invention, the policy based routing capability is dynamic. That is, the policy based routing only occurs during a session, e.g., during a video call. When the session terminates, the ATU-R 12 receives a signal indicating the session termination and the pattern matching and filtering cease. Accordingly, all traffic is routed over the normal channel.

Policy based routing thus occurs when an SVC 50 has been set up. For router mode, after the setup, the PC 10 sends a header pattern to the ATU-R 12 so that the ATU-R 12 knows to filter traffic matching the received pattern. In other words, the ATU-R 12 knows to send the traffic matching the header pattern to the new QoS connection. When a packet does not match the header pattern, the packet is sent along its normal route.

Current routing tables have routing entries associated with a destination network address. The current entries are typically too coarse to distinguish between the specific applications for the purpose of mapping into a specific route. According to the present invention, a new gateway (i.e., the QoS connection/the SVC) exists to handle special traffic (e.g., video conference traffic). Policy routing is a function to filter the video conference traffic and direct such traffic to a separate gateway different from that default gateway in the existing routing table.

In one embodiment, the syntax of the policy routing instruction is: <source IP network address, source network mask, destination IP network address, destination network mask, IP protocol ID, type of service (TOS), source port number, destination port number, gateway IP address, interface IP address, metric>. The IP protocol ID parameter defines the layer 4 protocol. The type of service parameter refers to a field in the IP header to carry information on traffic packet priority, e.g., best effort, highest priority, etc. The gateway IP address refers to the next hop. The interface IP address refers to the egress port. The metric defines an administrator assigned weight, the weight being assigned to different routes, e.g., hop count.

An example will now be provided. Assume the routing policy is as follows 64.2.12.3 255.255.255.0 217.34.67.122 255.255.255.255 17 8 6000 6000 66.2.12.1 64.2.12.3 1. Then, all packets having the value matching this specific policy will be directed to gateway 66.2.12.1 via 64.2.12.3, which is a local interface IP address.

Figure 3:
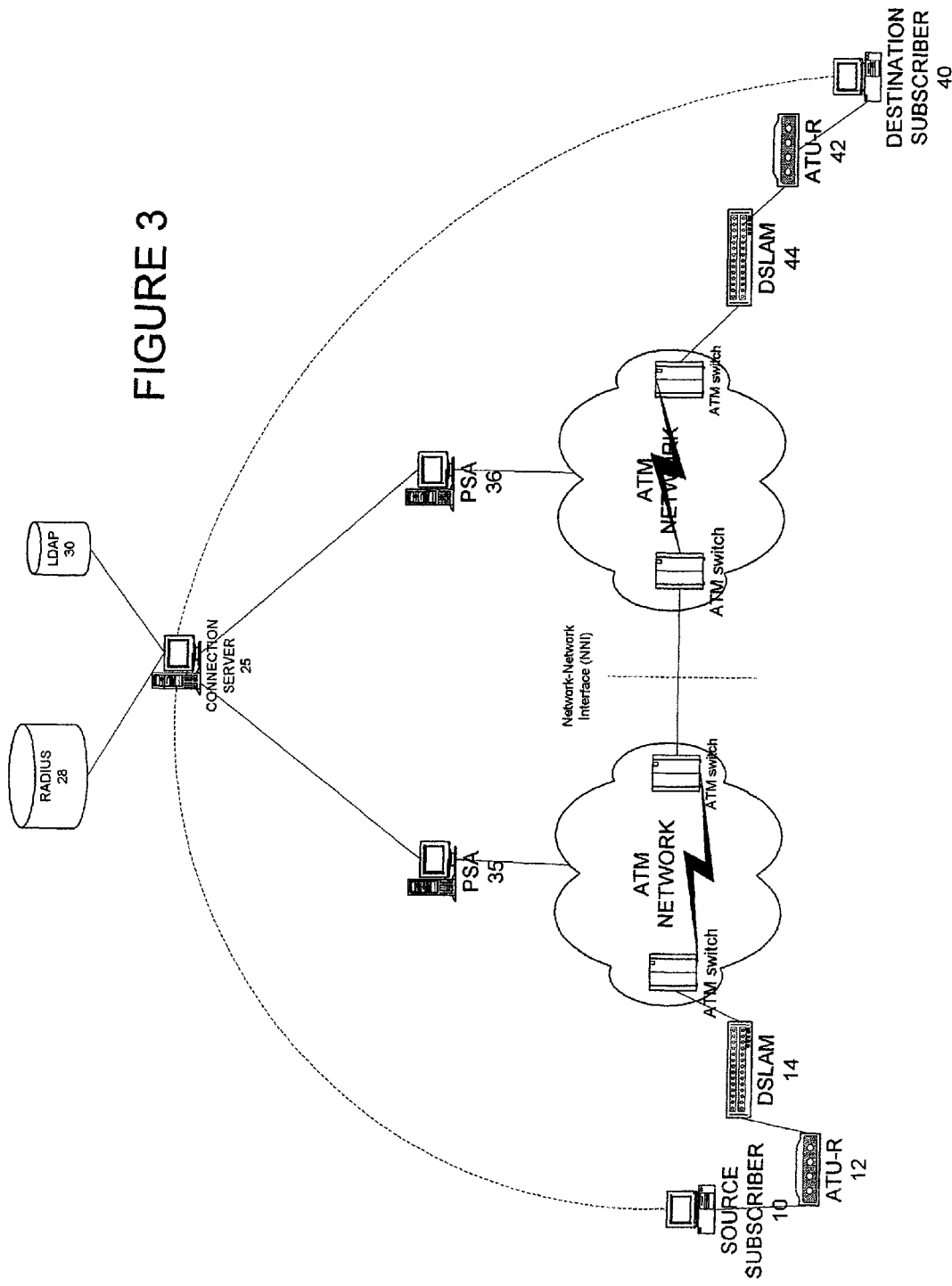
FIG. 3 is a block diagram showing an exemplary network architecture, according to another embodiment of the present invention.

Referring to FIG. 3, another embodiment is described in which multiple proxy signaling servers 35, 36 are provided. In this embodiment, the source subscriber 10 and the destination subscriber 40 may be assigned to different proxy signaling agents 35, 36 at the LDAP 30. In such a case, the setup process is slightly different. If both subscribers 10, 40 are located within the same ATM domain, the connection must choose which side to originate the SVC connection and to contact the originator's proxy signaling agent 35 to set up the connection. If the subscribers 10, 40 are located in different ATM domains (as shown in FIG. 3), e.g., different vendor domains owned by a single carrier, the connection server 25 establishes two connection segments, one originating at each subscriber, to a common network to network interface (NNI) meeting point. The connection server 25 can retrieve available NNI information from the LDAP 30 to handle these types of connections. The connection server 25 can also track real time state information about NNI usage.

As discussed above, a router mode and a bridge mode are available. In the router mode, the ATU-R 12 functions like a traditional router. That is, the ATU-R 12 examines the layer 3 and layer 4 information and routes packets based upon such information. Accordingly, the ATU-R 12 routes at the application level. In this embodiment, the routing table resides at the ATU-R 12. Moreover, it is well known that in the router mode the PPPoE session from subscriber to ISP originates on the ATU-R 12.

In the bridge mode, the ATU-R 12 functions like an Ethernet bridge with additional packet mapping capabilities. Ethernet bridges without additional mapping capabilities have no IP awareness and can only perform switching at a host level of granularity. The switching is based on MAC addresses, which are unique per client. In this embodiment, the routing table resides at the client 10 and the client 10 performs the routing. In addition, a packet mapping filter at the ATU-R switches the packets into different outgoing PVCs based on mapping rules associated with each QoS session. These rules consider layer three and layer four header information in a manner similar to the described policy routing method.

In the bridge model, a client DSL dialer application establishes a standard, best effort PPPoE session between the client PC 10 and the ISP B-RAS 22. The ISP 24 provides the client 10 with a public IP address, which is globally reachable. In the router mode, the ISP 24 assigns the ATU-R 12 a global IP address and the ATU-R 12 performs NAT for private addresses that it, in turn, assigns to the client 10.

In the bridge mode, policy routing occurs in the PC and a mapping occurs in the ATU-R. That is, the PC decides whether to send traffic over the PPP session or directly to the ATU-R over Ethernet. The packet received at the ATU-R, however, requires an additional mapping step. Once the traffic is received at the ATU-R, the ATU-R determines which PVC to send the traffic over. One PVC is assigned to the PPP session, and other PVCs can match different SVCs in the ATM network. The additional mapping step is enabled by a mapping table in the ATU-R that shows which PVCs are currently attached to SVCs. Although all packet travels through the ATU-R, some packets are encapsulated in a PPP session, whereas other packets are raw IP packets transported via the Ethernet connection.

Regardless of whether the bridge mode or the routed mode is in use, header patterns are always sent to the ATU-R. The header patterns that are sent are the same header patterns that the PC uses to determine whether to encapsulate the packet. That is, the PC decides whether to use PPP or not, and the ATU-R decides which PVC to use. Once an SVC is set up, both tables are updated.

In the router mode, all policy routing occurs in the ATU-R, therefore only one table exists. Accordingly, no dynamic changes occur in the PC and packets are not encapsulated in PPP by the PC. When appropriate, the ATU-R encapsulates the packets in PPP.

The connection server 25 terminates customer control channel sessions, which transit the public IP network. The control channel session is used by the customers to send CONNECT and DISCONNECT requests to the connection server 25. The connection server 25, in return, reports connection status information to the customers using the control channel session. In an embodiment of the present invention, this control channel session employs authentication and encryption.

The connection server 25 maintains two levels of sessions: (1) a per user session anchored on the control channel connection; and (2) a per SVC session anchored on individual SVC connections set up by the service. When a user logs in, the user establishes a user session that is associated with the user ID. Once the user establishes an SVC, an SVC session is created. If the user establishes another SVC, another SVC session is created. Thus, each user session may be associated with multiple SVC sessions.

The connection server 25 performs the CAC function for the user ATU-R and DSLAM ports and is able to manage the complex topology of any DSLAM 14. This is necessary because the pre-provisioned PVCs in the ATU-R 12 and DSLAM 14 will require over subscription of the priority bandwidth on the DSLAM up-link ports. Over subscription occurs when a group of PVCs, with aggregate bandwidth exceeding the actual available bandwidth, are created. It is assumed that, statistically, only a fraction of the PVCs are active simultaneously and that the bandwidth used by the active fraction does not exceed the actual available bandwidth. It is advantageous to service providers to over subscribe network resources to take advantage of this statistical multiplexing effect. For example, a DSLAM up-link may have enough bandwidth to handle ten simultaneous QoS connections. The service provider may choose to provision twenty QoS PVCs on that up-link if it is expected that typically only ten or fewer of the QoS PVCs are in use at one time. In this scenario, the connection server CAC function would prevent the eleventh QoS PVC from becoming active should the actual usage exceed the expected usage. Only as many pre-provisioned QoS PVCs may be active as there is bandwidth available thus ensuring the QoS of the active connections.

The connection server 25 can be any server class system, such as a UNIX workstation. The connection server 25 tracks the PVCs' status in real time, monitoring whether the PVCs are in use or available. If multiple applications share a PVC, the connections server 25 monitors how much available bandwidth is allocated to each application. When enough bandwidth is not available for a connection request, the connection server 25 denies service requests. The connection server 25 handles association of PVCs and SVCs, and also reserves space on PVCs.

In one embodiment, each DSLAM actually includes a master DSLAM and at least one slave DSLAM. In this embodiment, the connections server 25 is aware of the DSLAM topology, e.g., the total bandwidth available on a DSLAM trunk port. The topology information is useful so that the connection server 25 is aware of which PVCs are used to connect from the trunk port of the master DSLAM to the appropriate subscriber port. The connections server 25 ensures that enough bandwidth exists for a connection request, and if so, grants the bandwidth to the user.

Figure 2:
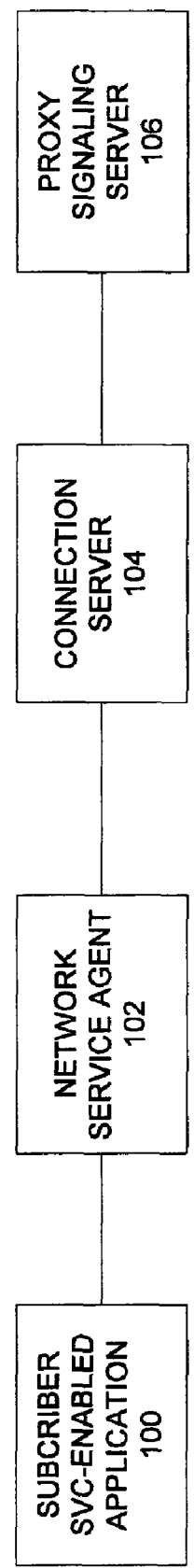
FIG. 2 is a block diagram illustrating an exemplary relationship between logical components, according to an aspect of the present invention.

A logical view of the system is now described with reference to FIG. 2. A subscriber SVC-enabled application 100, running on the client PC, negotiates with a peer to establish agreed upon parameters for a direct SVC connection. This negotiation occurs using the best effort PPPoE channel, i.e., the control channel. Both SVC-enabled end points must agree upon a required class of service, a required bandwidth or bit rate, and a shared secret or session key that uniquely identifies the proposed session between these two end points. The mechanism of this negotiation is independent of the SVC service. For example, the negotiation could be an Instant Messaging server facilitated negotiation or a voice telephone call between users.

The subscriber SVC-enabled application 100 at each endpoint sends a request to establish a SVC connection to its respective network service agent 102, which resides in the subscriber's computer 10 or the ATU-R 12. The request includes the source username, destination username, class of service, bandwidth, shared session key, and IP routing/mapping information.

The network service agent 102 can be located on either the client PC 10 or the ATU-R 12. In the bridge mode, the network service agent 102 resides on the subscriber's system 10 and in the router mode it resides on the subscriber's ATU-R 12. The network service agent 102 handles network layer connection duties, including managing an API interface between the ATU-R 12 and the subscriber 10. The network service agent 102 also manages the routing tables as well as session establishment and termination. In addition, the network service agent 102 executes packet filtering rules.

In one embodiment, the network service agent 102 includes two input APIs: (1) an HTTP or command line API, e.g., a Telnet based configuration suitable for direct human interaction, and (2) a socket based API for process to process communications. Users or applications, which are clients of the network service agent 102, can send CONNECT, DISCONNECT, STATUS, and REACHABILITY requests to the connection server 104 via the network service agent 102 and the secure connection between the network service agent 102 and the connection server 104. Return information from client requests should be explicitly output to the user in the case of the human readable interface. For the process to process API, return information can be returned via the socket connection between the client process 100 and network service agent 102. In addition, the client process 100 should be able to poll status information via the network service agent 102 to self determine the result of requests.

Because the network service agent 102 changes the routing and mapping tables, the layer 3 and layer 4 information associated with the SVC flow must be communicated by the application or user to the network service agent 102 as part of the CONNECT request. Only the information relevant to layer 2 provisioning is passed on to the connection server 104 for the SVC portion of the connection establishment.

Output APIs are also provided in the network service agent 102. In the bridge mode, the network service agent 102 (residing in the client 10) manipulates the static policy routing tables in the client 10 and the mapping filter function in the ATU-R 12. In the router mode, the network service agent 102 (residing in the ATU-R 12) manipulates the policy routing tables and mapping filter function of the ATU-R 12. As noted above, in the router mode the client 10 uses the ATU-R 12 as the default layer 3 gateway and does not require additional configuration.

The network service agent 102 is responsible for establishing a secure connection to the connection server 104, providing authentication information to the connection server 104, and authenticating the identity of the connection server 104. The network service agent 102 is also responsible for handling client requests by working with the connection server 104, over the network service agent 102/connection server 104 secure channel, to establish and tear down SVC connections and to poll current status information. In response to SVC status changes resulting from configuration requests or network events, the network service agent 102 re-configures routing and mapping tables in the client 10 and/or ATU-R 12 to maintain appropriate routing of client traffic.

Each network service agent (local and remote) 102 will, on-demand, establish a secure channel to the connection server 104 over the best effort PPPoE channel. The network service agent 102 also authenticates each user to determine whether the user is authorized to establish SVCs. Once authenticated, the connection server 104 authenticates the management session and responds to connection setup requests, connection tear down requests, connection status polls, and reachability inquiries.

In one embodiment, to service a connection setup request, the connection server 104 receives matching connection requests from both network service agents 102 within a time-out window. The connection requests should have matching attribute elements. To service a connection tear down request, the connection server 102 can receive a request from only one of the network service agents 102. The connection server 104 may respond to connection status polls with status messages indicating the SVCs in use, class of service, bandwidth, session keys, etc. Optionally, the connection server 104 may also send asynchronous status updates to the network service agents 102 upon connection and/or disconnection.

In the event of connection setup or tear down, the connection server 104 communicates with the proxy signaling agent 106 to accomplish the requested provisioning task. The proxy signaling agent 106 signals the network elements to provision the SVC. Upon confirmation of successful provisioning, the SVC status is passed back to the connection server 104 and to the network service agent 102.

After receiving verification of SVC setup, each network service agent 102 changes policy routing tables in the PC 10 or ATU-R 12, in bridge and routing modes, respectively; changes mapping functions in the ATU-R 12; and informs the requesting subscriber SVC-enabled application 100 that the SVC channel has been configured. The mapping functions in the ATU-R 12 include the rules that the ATU-R 12 should use for filtering each packet and directing the packet into a specific PVC that connects to the SVC. As discussed above, the mapping function is dynamically established to correspond to the SVC session duration.

Informing the application 100 that the SVC channel has been configured may be accomplished in a session established between the subscriber SVC-enabled application 100 and the network service agent 102. Alternatively, the subscriber SVC-enabled application 100 may simply poll the network service agent 102 for connection status to self determine success or failure.

Once the SVC has been established and appropriate routing changes have been made, packets matching the policy routing and/or mapping rules will be transmitted over the SVC channel as long as the SVC is active.

The SVC may be deactivated by either: (1) the subscriber SVC-enabled application 100 sending a disconnect request to the connection server 104 via its network service agent 102, (2) termination of the connection server 104 to network service agent 102 management channel (either explicit or time-out), or (3) a network event such as re-routing or other failure. When a network event occurs, the SVC status is known by the proxy signaling agent 106 and communicated to the connection server 104. Moreover, the connection server 104 informs both sides that the SVC has been cleared. In the event of a disconnect request or termination of the management channel, the connection server 104 informs the non-disconnected side that the SVC has been cleared.

Upon notification of SVC tear down via either an update message or status polling, the network service agent 102 modifies the policy routing and mapping tables in the client device 10 and/or ATU-R 12 to reflect the change in connectivity.

Communications between the network service agent 102 and the connection server 104 are now discussed in more detail.

A CONNECT request should include the following parameters: source subscriber, destination subscriber, class of service, bandwidth, and session key. In order to process the CONNECT request, matching CONNECT requests should be received from both the source subscriber and the destination subscriber within a time-out period. The connection server 104 processes validated CONNECT requests by querying the LDAP 30 to determine required provisioning information, such as ATM AESA addresses, available PVC identifiers at each end-point, etc. The connection server 104 also selects suitable PVC identifiers, class of service, and traffic descriptors, and performs CAC functions for ATU-R and DSLAM ports based on real time SVC tracking information and port speeds obtained from the LDAP 30. Finally, the connection server 104 services validated CONNECT requests by passing provisioning information to the proxy signaling agent 106.

Upon being notified by the proxy signaling agent 106 of successful provisioning or failure to provision, the connection server 104 updates its internal real time SVC session tracking information. The provisioning result may be communicated to the calling network service agents 102 by an explicit response to the CONNECT request and/or waiting for the network service agent 102 to inquire about the current SVC status information (polling).

A DISCONNECT request should include the following parameters: source subscriber, destination subscriber, class of service, bandwidth, and session key. A DISCONNECT request is determined to be valid when it is received from one or both network service agents 102 and it matches an existing, previously established SVC connection. The connection server 104 services valid DISCONNECT requests by matching the DISCONNECT request with its real time SVC tracking table, and communicating stored information to the proxy signaling agent 106 to clear the SVC.

Upon provisioning success or failure, communicated by the proxy signaling agent 106, the connection server 104 updates its internal real time SVC session tracking information. The provisioning result may be communicated to the calling network service agent 102 by an explicit response to the DISCONNECT request and/or waiting for the network service agent 102 to inquire about the current SVC status information (polling).

A STATUS request requires no parameters. The connection server 104 simply updates the requesting network service agent 102 with the status of all SVCs terminated by the ATU-R 12 managed by the network service agent 102.

A REACHABILITY request requires a destination subscriber parameter. In response to a REACHABILITY request, the connection server 104 informs the querying network service agent 102 of whether the destination subscriber is reachable, via SVC, from the source subscriber 10. The response to the request only confirms that source to destination connectivity is possible, and it does not take into account available bandwidth, etc.

Each network service agent 102 connects to the connection server 104 to initiate SVC connections. This network service agent 102 to connection server 104 connection is made over the public Internet, and it must be authenticated and secure.

If the network service agent 102 to connection server 104 connection is dropped or times out, any SVCs established by the network service agent's username is automatically released by the connection server 104. In the case of multiple network service agent 102 to connection server 104 connections using the same username (PC client based network service agent 102), all SVCs established under the username must be released automatically once the final network service agent 102 to connection server 104 connection is dropped or times out. Time outs may be determined using an explicit keep-alive mechanism if this is not provided by the secure encryption layer.

An advantage of the proxy signaling approach described above is that such an approach does not require SVC capability for ATU-Rs or for DSLAMs. If the ATU-R does have SVC capability, another approach may be employed. Such an approach will be referred to as Extended Virtual UNI.

Thus, according to the present invention a subscriber can dynamically connect to a selected peer via a combination of a SVC PVCs. Once the SVC is established, the packets are policy routed. Consequently, quality of service can be guaranteed for specific end user applications.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims. For example, although the description has been directed towards setting up a QoS connection to a peer subscriber, the connection(s) could also be set up to one or more application service providers (ASPs).

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium, e.g., a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for signaling and packet-switched network transmission and public telephone networks (e.g., ATM and DSL) represent examples of the state of the art. Such standards are periodically superseded by faster or more efficient equivalents having essentially the same functions. Accordingly, replacement standards and protocols having the same functions are considered equivalents.

What is claimed is:

1. A method of policy-based routing of packets over a peer-to-peer, quality of service connection, comprising:
    sending a connection setup request, over a control connection to a connection establishing device, to dynamically establish the peer-to-peer, quality of service connection between a source peer implemented on at least one device and a destination peer implemented on at least one device;
    transmitting from the source peer implemented on at least one device, over the peer-to-peer, quality of service connection, packets originating from an application requiring a specified level of service; and
    transmitting from the source peer implemented on at least one device, over a best effort connection, packets originating from an application that does not require the specified level of service,
    wherein the connection establishing device establishes the peer-to-peer, quality of service connection in response to the connection setup request, and
    wherein the application requiring the specified level of service comprises a video conference application.

2. The method according to claim 1,
    wherein the peer-to-peer, quality of service connection bypasses an Internet service provider.

3. The method according to claim 1, further comprising: dynamically selecting the destination peer implemented on at least one device.

4. The method according to claim 1,
    wherein a portion of the control connection comprises a manually configured permanent virtual connection.

5. The method according to claim 1,
    wherein a portion of the control connection comprises a second, best effort connection.

6. The method according to claim 1,
    wherein the connection setup request includes an identification of the destination peer implemented on at least one device, a shared session key, a class of service and a traffic descriptor.

7. The method according to claim 1,
    wherein the source peer implemented on at least one device sends the connection setup request.

8. The method according to claim 7,
wherein the destination peer implemented on at least one device sends a second connection setup request having common information with the connection setup request.

9. At least one source peer device for policy-based routing of packets over a peer-to-peer, quality of service connection, comprising:
a first transmitter that sends a connection setup request, over a control connection to a connection establishing device, to dynamically establish the peer-to-peer, quality of service connection between the source peer implemented on at least one device and a destination peer implemented on at least one device; and
a second transmitter that transmits, over the peer-to-peer, quality of service connection, packets originating from an application requiring a specified level of service and that transmits, over a best effort connection, packets originating from an application that does not require the specified level of service,
wherein the connection establishing device establishes the peer-to-peer, quality of service connection in response to the connection setup request, and
wherein the application requiring the specified level of service comprises a video conference application.

10. The at least one source peer device according to claim 9,
wherein the policy-based routing is based on a user session.

11. The at least one source device according to claim 10,
wherein policy-based routing terminates when the user session terminates.

12. The at least one source peer device according to claim 9,
wherein the packets originating from the application that does not require the specified level of service are sent to a default gateway, and
wherein the packets originating from the application requiring the specified level of service are sent to a separate gateway.

13. The at least one source peer device according to claim 9,
wherein the connection establishing device performs call admission control based on up-link port speeds and synchronization rates.

14. The at least one source peer device according to claim 9,
wherein the connection establishing device maintains state information for currently available bandwidth at the destination peer implemented on at least one device and the source peer implemented on at least one device.

15. The at least one source peer device according to claim 9,
wherein header patterns for the packets originating from the application requiring the specified level of service are matched with a stored pattern prior to transmitting over the peer-to-peer, quality of service connection.

16. A tangible non-transitory storage medium storing a program, recorded on the tangible storage medium, for policy-based routing of packets over a peer-to-peer, quality of service connection, comprising:
a receiving code segment, recorded on the tangible storage medium, that receives a connection setup request from a source peer implemented on at least one device, over a control connection; and
an establishing code segment, recorded on the tangible storage medium, that dynamically establishes the peer-to-peer, quality of service connection between the source peer implemented on at least one device and a destination peer implemented on at least one device,
wherein packets originating from an application requiring a specified level of service are transmitted, over the peer-to-peer, quality of service connection, from the source peer implemented on at least one device, and
wherein packets originating from an application that does not require the specified level of service are transmitted, over a best effort connection, from the source peer implemented on at least one device, and
wherein the application requiring the specified level of service comprises a video conference application.

17. The tangible non-transitory storage medium according to claim 16, further comprising:
a selecting code segment, recorded on the tangible computer readable medium, that selects one of the source peer implemented on at least one device and the destination peer implemented on at least one device to originate the peer-to-peer, quality of service connection when the source peer implemented on at least one device and the destination peer implemented on at least one device are in a common domain.

18. The tangible non-transitory storage medium according to claim 16, further comprising:
a second establishing code segment, recorded on the tangible storage medium, that establishes a first connection segment between the source peer implemented on at least one device and a common network to network interface meeting point and that establishes a second connection segment between the destination peer implemented on at least one device and the common network to network interface meeting point.

19. The tangible non-transitory storage medium according to claim 16, further comprising:
an authentication code segment, recorded on the tangible storage medium, that obtains at least one of authorization information and authentication information from a server.

* * * * *

UNITED STATES PATENT AND TRADEMARK OFFICE
CERTIFICATE OF CORRECTION

PATENT NO. : 8,199,760 B2  
APPLICATION NO. : 12/554463  
DATED : June 12, 2012  
INVENTOR(S) : W. Chen et al.

Page 1 of 1

It is certified that error appears in the above-identified patent and that said Letters Patent is hereby corrected as shown below:

On the Title Page; Foreign Patent Documents; 1st page "EP 8-186580" should be --JP 8-186580--.

On the Title Page; Other Publications; Page 2; Column 2 "Clark et al., . . . analcs.mit.edu" should be --Clark et al., . . . ana.lcs.mit.edu--.

On the Title Page; Other Publications; Page 2; Column 2 "dspport: Display Port . . . Rev. B0o" should be --dspport: Display Port . . . Rev. B0--.

Signed and Sealed this
Twenty-ninth Day of January, 2013

David J. Kappos  
*Director of the United States Patent and Trademark Office*